United States Patent [19]

Suutarinen

[11] Patent Number: 5,130,029
[45] Date of Patent: Jul. 14, 1992

[54] FLOTATION METHOD FOR PURIFICATION OF A LIQUID FROM SOLID AND LIQUID IMPURITIES

[76] Inventor: Oiva Suutarinen, Rysäkuja 5, 02260 Espoo, Finland

[21] Appl. No.: 623,069

[22] Filed: Dec. 6, 1990

[30] Foreign Application Priority Data

Apr. 28, 1989 [FI] Finland ............... 892045

[51] Int. Cl.$^5$ ............... C02F 1/24
[52] U.S. Cl. ............... 210/703; 210/793; 210/807
[58] Field of Search ............... 210/703, 707, 792, 793, 210/801, 806, 807, 221.1, 266

[56] References Cited

U.S. PATENT DOCUMENTS

| | | | |
|---|---|---|---|
| 3,506,125 | 4/1970 | Willis et al. | 210/703 |
| 3,769,207 | 10/1973 | Baer | 210/703 |
| 3,997,970 | 8/1976 | Willis et al. | 210/703 |
| 4,618,430 | 10/1986 | Farret, Jr. et al. | 210/703 |

*Primary Examiner*—Thomas Wyse
*Attorney, Agent, or Firm*—Steinberg & Raskin

[57] ABSTRACT

Method for purifying a liquid from solid and liquid impurities by flotation-filtration in which the dirt flocks in the liquid to be purified are separated from the liquid to be purified after which they are led to the top of the liquid to form a sludge bed 16 from there to continue out to a sludge canal 17 and to a drain. The purified liquid flows further through a sand filter 18 to an isolated space 20 under the filter, through filter nozzles 19 and from there further through a pipe system 23, to, for example, a pure water reservoir. The filter is washed in an upstream direction by an opposite water flow. The sludge canal which also works as a rinsing water canal (17) or only as a rinsing water canal and the rinsing water canal (22) are placed on different sides of the filtration apparatus and only the canal that works as a rinsing water canal (22) is situated behind the separation canal (12) which means that the rinsing water has to flow over the separation canal (12).

4 Claims, 1 Drawing Sheet

FLOTATION METHOD FOR PURIFICATION OF A LIQUID FROM SOLID AND LIQUID IMPURITIES

BACKGROUND OF THE INVENTION

The invention is concerned with a method for purifying liquid of solid and liquid impurities by flotation filtration through which the dirt flocks and liquid impurities 15 in the liquid are separated from the liquid to be purified after which they are led to the top of the liquid to form a sludge bed 16 and from there to continue out to a sludge canal 17 and to a drain, the purified liquid continuing through a sand filter 18 to an isolated space 20 under the filter, through filter nozzles 19 and from there onwards through pipe system 23, for example to a pure water reservoir, which filter is washed in an upstream direction by an opposite water flow.

The best method for purification of drinking water, household water and industrial process water in Finland has proven to be the flotation method. It is equally appropriate for purification of surface water and ground water. It is also very appropriate for purification of both municipal and industrial waste water. The flotation method is very economical due to its small cubic volume requirement, to its many form possibilities, to its effectiveness, to its small power demand and due to the excellent purification results that can be achieved. It can also be very advantageously used to increase the power of old plants and to improve the purification results.

Surface waters in Finland have a very big humus content. When chemical purification is used to remove humus and other impurities very light flocks are produced. Because of this the flotation method is very suitable, since it makes the dirt flocks that are on their way to the surface rise all the way to the surface and furthermore all the flocks rise to the surface.

The process is also adequate for iron bearing ground water, because the fine bubble air used in this process divided in the right way catches the dirt flocks so well that there is no hindrance to their gathering at the surface.

Based on experience it has been proven that no surface or ground draw water exists that cannot be purified by using the flotation process correctly, together with the right chemicals, with the result being good clean water.

The aforementioned results of the flotation process are the same when waste water is being treated because solid particles can be decreased to a minimum.

Two different ways for using the flotation method in liquid purification can be distinguished. One way is to use it as it is for clarification but when optimum purification results are desired, an additive sand filtration is needed.

Although the flotation process is very fast, it has still been found possible to develop a method wherein the flotation process itself and the removal of the sludge which is produced by the process take place in the upper part and the sand filtration takes place in the lower part of the same basin. Because the sand filters will get dirty in due course and will have to be washed, that is, rinsed upstream, and because the flotation sludge bed has to be removed at times, which does not happen at the same time if the plant is being used economically, that will place obstacles in the way of the size of the flotation filters and in the way of the loss of the waste water quantity, particularly when big plants are used. When these are being used this can be a decisive factor.

SUMMARY OF THE INVENTION

An object of the invention is to utilize the aforementioned information such that the process will be as efficient as possible.

To achieve this object the method of the invention is mainly characterized in that the canal which functions as a sludge canal functions also as a rinsing water or washwater canal or functions only as a rinsing water canal and that another rinsing water canal is placed on a different side of the filtration apparatus and that only the canal that works as a rinsing water canal is situated behind the separation canal which means that the rinsing water has to flow over the separation canal.

The method represented in the invention eliminates the above-mentioned disadvantages and produces ideal circumstances for the flotation operation, for sludge removal, for the sand filter filtration, for backwashing of the sand filter, and for all shapes and cubic capacities.

BRIEF DESCRIPTION OF THE DRAWINGS

The invention is illustrated in detail by the enclosed Figures which illustrate preferred embodiments of the invention, to which the invention should not be assumed to be limited.

DESCRIPTION OF THE PREFERRED EMBODIMENTS

Figure 1:
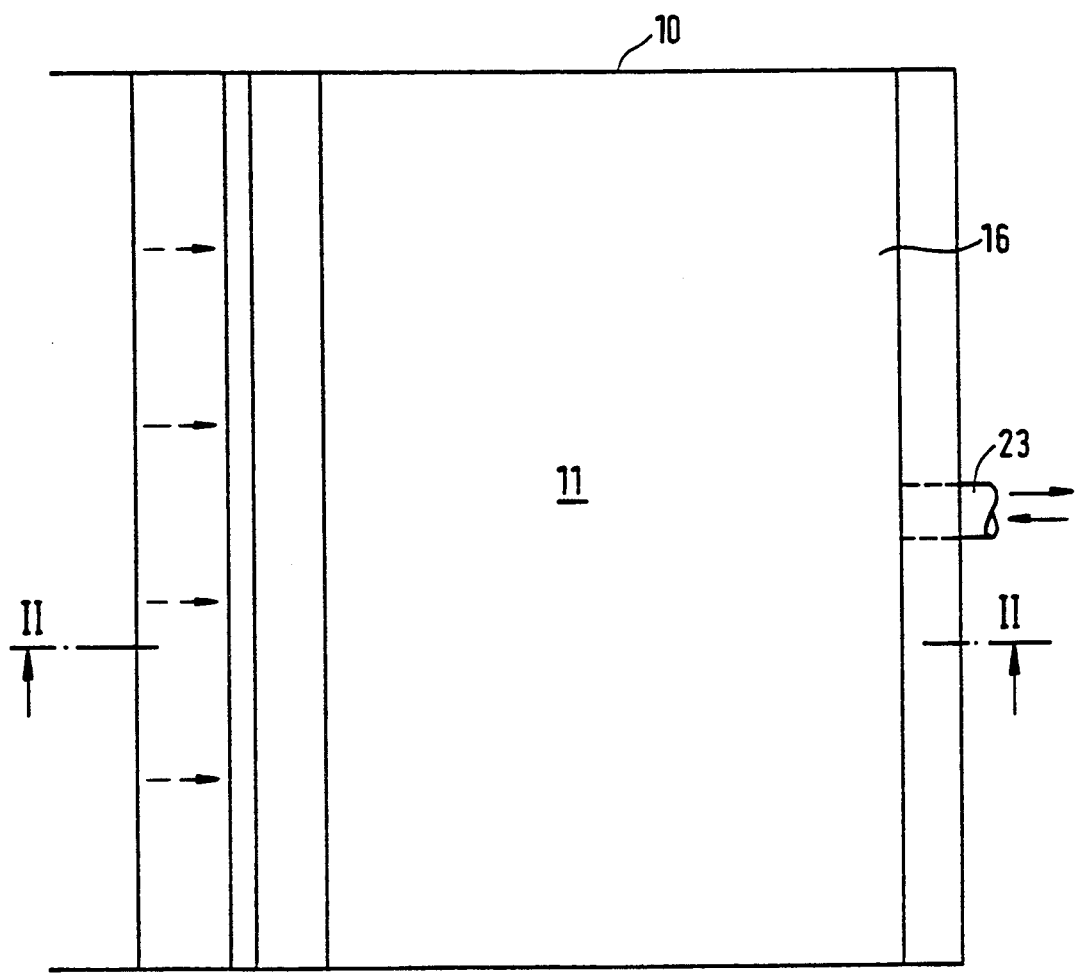
FIG. 1 shows a preferred embodiment of the invention as seen from above.
Figure 2:
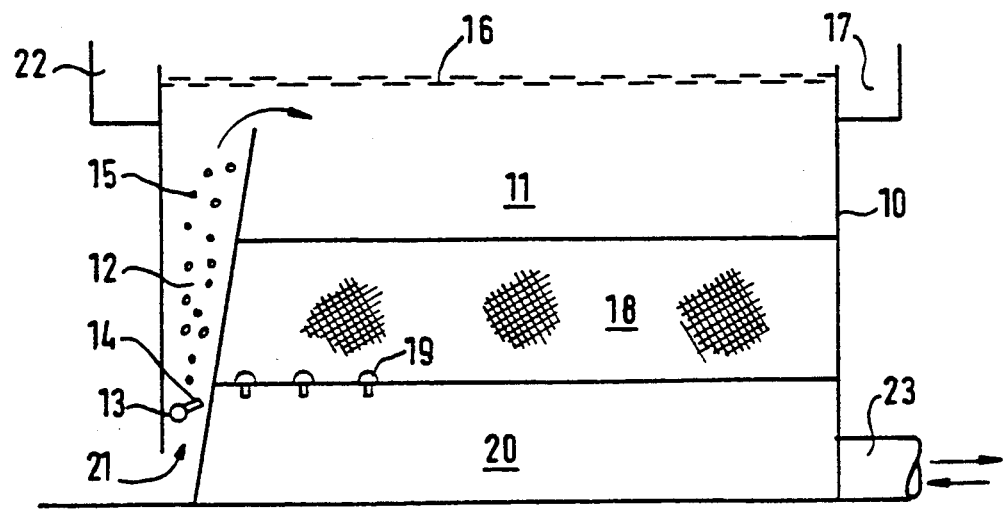
FIG. 2 shows a sectional view taken along line II—II of FIG. 1.

The flotation filtration apparatus in FIGS. 1 and 2 has been identified generally with the reference number 10. The plant 10 comprises a flotation filter 11 and apparatus that has been attached to it. Flotation clarification, removal of the separated sludge, sand filtration and backwashing of the filter all take place in this same basin. Apparatus 10 also comprises an inflow opening 21 through which the liquid to be purified (wherein the impurities already have the shape of flocks) flows to the separation canal 12. In the preferred embodiment the filtration apparatus is of rectangular shape at its base and water enters at one of its long sides. To the liquid to be purified there is added a small amount of water which contains dissolved air through a distribution pipe 13. The dissolved air is made to spread across the width of the whole basin 11. This occurs because of the nozzles 14 in this distribution pipe, wherein the air has the shape of microscopically small air bubbles. These air bubbles catch the dirt particles 15 in the separation canal 12 and they catch, for example, the grease in the oil particles 15 which constitute liquid impurities in the liquid to be purified and they lift it to the surface of the liquid to be purified. These solid and liquid impurities spread over the whole basin and form sludge bed 16. The sludge bed is moved at intervals to canal 17 and from there on to the drain.

In this manner the purified water flows downwards through the sand filter 18 and onwards for example through the filter nozzles 19 on the bottom of the sand filters to the isolated space 20 under the filters and from there through the piping 23 to, for example, a pure water reservoir.

In the event that there are some dirt particles left in the liquid to be purified, the sand filter will catch them.

Due to this the filter will slowly get dirty and, when it gets sufficiently dirty, the filter has to be backwashed, that is, rinsed out. This is done in the following manner: Water is pumped through the piping 23 to the isolated space 20 under the filter. It will flow upstream through nozzles 19 to the sand layer 18 of the filter 18 and through this layer to the upper part of the filter and further to the sludge removal canal 17 and to the rinsing water canal 22. The rinsing water canal 22 is situated on the opposite side of the separation canal 12 as the sand filter, which means that the rinsing water or washwater has to flow over the separation canal. Accordingly the rising water or washwater in separation canal 12 spreads evenly in the filtration apparatus 10 on both sides and the filtration apparatus 10 can be made considerably wider than if there was only one canal on one side of the filtration apparatus. Thus the filtration apparatus 10 can be given an ideal shape wherein its increased width allows for greater throughput of the liquid to be purified. Also clarification, filtration, sludge removal and backwashing, and other process operations in the flotation filtration apparatus 10 can thus take place within an ideally shaped filtration apparatus. In a preferred embodiment of the invention there are mounted in the front wall of the input or separation canal 12 guiding disks or plates for the filters (not shown) to hinder the sand from coming to the separation canal 12 during the backwashing of the filter 18.

If the rinsing water canal or the other canals were placed in a previously known way transversely in relation to the flotation filtration apparatus, the above-mentioned functions would deteriorate in their interactions with each other, that is, they could not all be made to function at the same time in an ideal way.

The lack of the extra canal in the flotation filtration apparatus disclosed in the present invention has been a great disadvantage in its otherwise ideal shape ever since the flotation filtration apparatus was brought into use 20 years ago. This, among other things, gives the invention its importance.

In the following there are presented the patent claims. The details of the invention can vary within the scope of the inventive ideal that is defined by the patent claims.

I claim:

1. Method of removing solid and liquid impurities by flotation filtration from a liquid to be purified, which comprises passing said liquid to be purified upwardly through a separation canal located along a first side of a filtration apparatus and causing solid and liquid impurities in said liquid to rise to the surface forming a sludge bed of said impurities on the surface of the liquid in a central basin of the filtration apparatus, passing the thus formed sludge bed from the separation canal to a sludge canal located at an opposite side of the filtration apparatus, providing a sand filter below said sludge bed in the central basin of the filtration apparatus, such that the liquid in the central basin flows downward through the sand filter and to an isolated space below the sand filter, the sand filter substantially removing any remaining impurities from the liquid, providing a rinsing water canal located at the first side of the filtration apparatus, opposite the side of the sludge canal across the top of the separation canal, and backwashing the sand filter by pumping rinsing water through the isolated space and upward through the sand filter, such that the rinsing water is caused to flow into the sludge removal canal and over the separation canal into the rinsing water canal, thus causing spreading of the liquid from the separation canal evenly across filtration apparatus, whereby filtration of the liquid is facilitated.

2. The method of claim 1, further comprising causing said liquid to flow into one of the two relatively long sides of said filtration apparatus which has a rectangular shape at its base.

3. The method of claim 1, further comprising using a jet to drive water containing microscopic air bubbles into said separation canal to cause said solid and liquid impurities of said liquid to rise to said surface.

4. The method of claim 1, further comprising mounting guiding plates or disks on said sand filter to hinder sand from entering said separation canal during backwashing of said sand filter.

* * * * *